United States Patent
Young

(10) Patent No.: US 7,094,170 B2
(45) Date of Patent: Aug. 22, 2006

(54) CUSHIONED SPROCKET AND IMPROVED INVERTED TOOTH CHAIN FOR USE WITH SAME

(75) Inventor: James D. Young, Chesaning, MI (US)

(73) Assignee: Cloyes Gear and Products, Inc., Paris, AR (US)

(*) Notice: Subject to any disclaimer, the term of this patent is extended or adjusted under 35 U.S.C. 154(b) by 37 days.

(21) Appl. No.: 10/430,536

(22) Filed: May 6, 2003

(65) Prior Publication Data

US 2003/0228950 A1 Dec. 11, 2003

Related U.S. Application Data

(60) Provisional application No. 60/387,219, filed on Jun. 8, 2002, provisional application No. 60/378,273, filed on May 6, 2002.

(51) Int. Cl.
*F16H 55/06* (2006.01)
*F16H 55/12* (2006.01)

(52) U.S. Cl. .................. 474/161; 153/156; 153/213

(58) Field of Classification Search .............. 474/161, 474/94, 212–213, 152–156; 74/594.2, 574
See application file for complete search history.

(56) References Cited

U.S. PATENT DOCUMENTS

| | | | |
|---|---|---|---|
| 527,153 A | 10/1894 | Murphy et al. | |
| 975,938 A | 11/1910 | Downey | |
| 1,870,801 A | 8/1932 | Engstrom | |
| 2,003,528 A | 6/1935 | Best | |
| 2,199,292 A | 4/1940 | Pierce | |
| 2,525,561 A * | 10/1950 | Pierce | 474/213 |
| 2,720,119 A | 10/1955 | Sherman | |
| 2,953,930 A | 9/1960 | Meyer | |
| 3,057,219 A | 10/1962 | Montgomery | |
| 3,377,875 A | 4/1968 | Sand | |
| 3,448,629 A | 6/1969 | Pfrank et al. | |
| 3,495,468 A | 2/1970 | Griffel | |
| 3,597,985 A | 8/1971 | Jeffrey | |
| 4,022,072 A | 5/1977 | Chagawa et al. | |
| 4,227,422 A | 10/1980 | Kawashima et al. | |
| 4,261,214 A | 4/1981 | Watanabe et al. | |
| 4,332,574 A | 6/1982 | Aoyama et al. | |
| 4,342,560 A | 8/1982 | Ledvina et al. | |
| 4,348,199 A | 9/1982 | Oonuma et al. | |
| 4,832,668 A | 5/1989 | Ledvina et al. | |
| 4,850,942 A | 7/1989 | Dalferth | |
| 4,869,709 A * | 9/1989 | Nagano | 474/161 |
| 4,906,224 A | 3/1990 | Reber | |
| 4,915,675 A | 4/1990 | Avramidis | |
| 5,224,903 A | 7/1993 | Langhof et al. | |
| 5,360,378 A | 11/1994 | Suzuki et al. | |
| 5,427,580 A | 6/1995 | Ledvina et al. | |

(Continued)

FOREIGN PATENT DOCUMENTS

| | | | |
|---|---|---|---|
| DE | 3942761 A1 * | 8/1991 | .................. 474/94 |

(Continued)

*Primary Examiner*—Marcus Charles
(74) *Attorney, Agent, or Firm*—Fay, Sharpe, Fagan, Minnich & McKee, LLP

(57) ABSTRACT

A sprocket for an inverted tooth chain includes at least one and typically first and second resilient cushion rings for adapted to be engaged by the guide links of an associated inverted tooth chain. The sprocket is usable with conventional inverted tooth chains and/or with a new inverted tooth chain that includes guide links for each row of the chain.

8 Claims, 9 Drawing Sheets

U.S. PATENT DOCUMENTS

| | | | |
|---|---|---|---|
| 5,819,910 A | 10/1998 | Langer et al. | |
| 5,980,408 A | 11/1999 | Schulz | |
| 5,984,817 A | 11/1999 | Schulz | |
| 6,179,741 B1 | 1/2001 | Young | |
| 6,371,875 B1 | 4/2002 | Young | |
| 2002/0013191 A1* | 1/2002 | Saito et al. | 474/161 |

FOREIGN PATENT DOCUMENTS

| | | |
|---|---|---|
| DE | 846 889 | 10/1998 |
| DE | 846 890 | 10/1998 |
| DE | 19961046 A1 * | 6/2001 |
| EP | 1 120 586 A2 | 8/2001 |
| FR | 1186486 | 8/1959 |
| FR | 2 325 804 | 9/1975 |
| GB | 1 277 277 | 6/1972 |
| JP | 57-173649 | 10/1982 |
| JP | 57190160 | 11/1982 |
| JP | 06200985 | 7/1994 |
| JP | 11-2312 | 1/1999 |
| JP | 2000-288645 A * | 10/2000 |
| JP | 2004-19673 A * | 1/2004 |
| SU | 386186 | 9/1973 |

\* cited by examiner

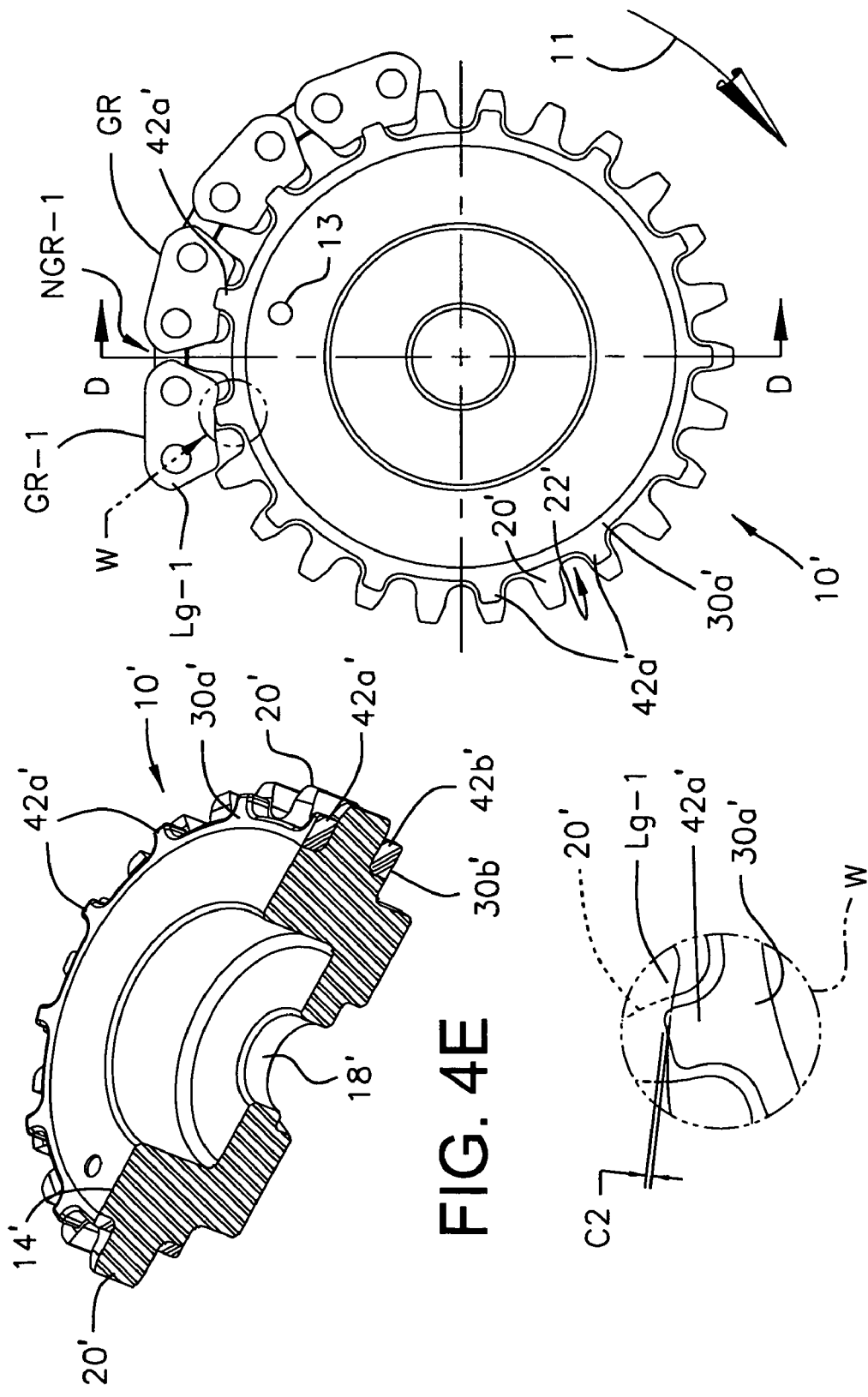

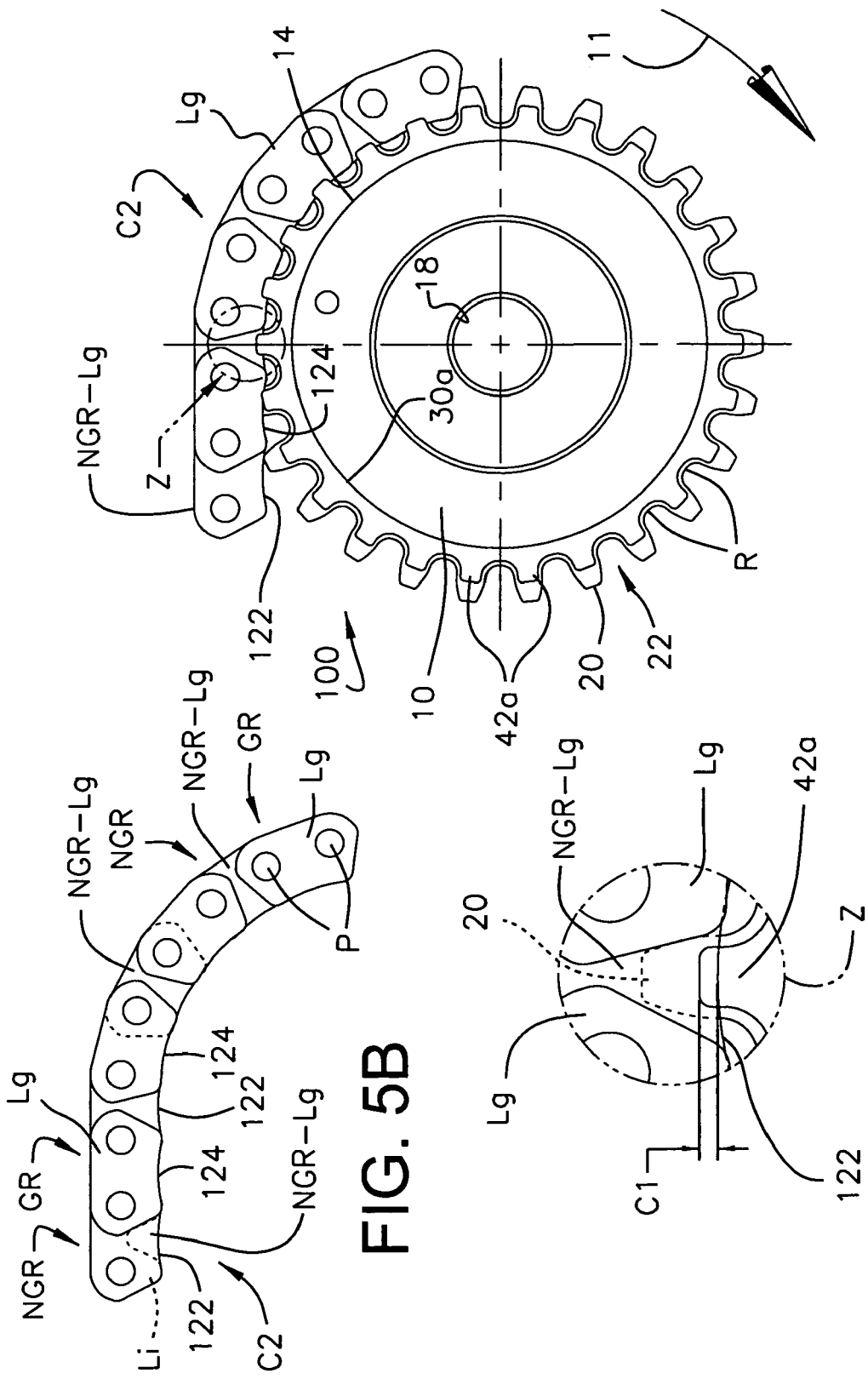

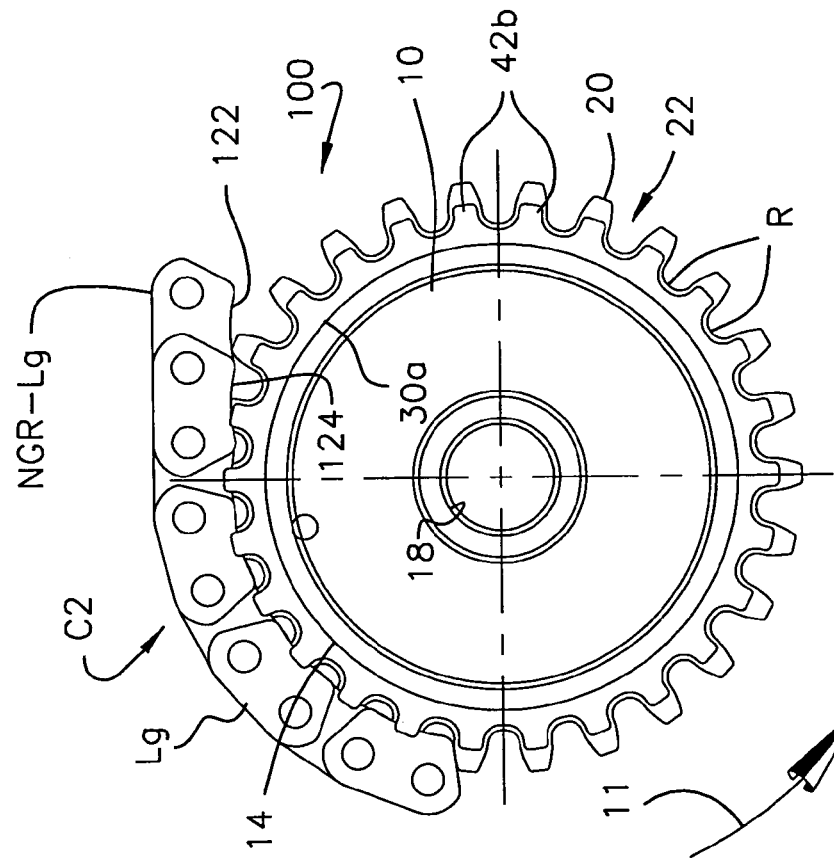
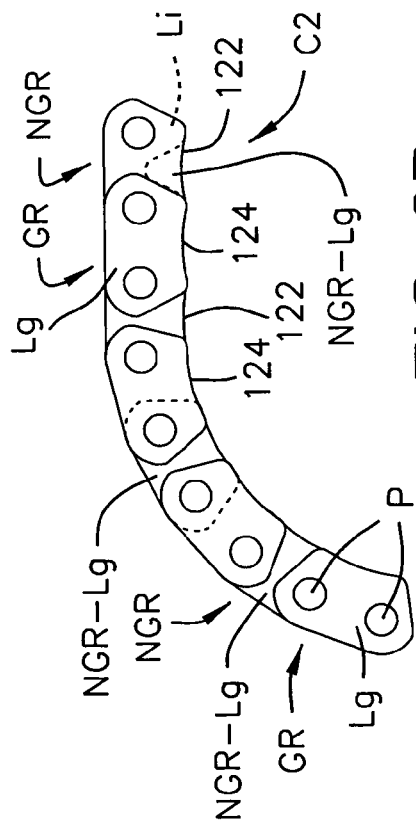
FIG. 6A
FIG. 6B

CUSHIONED SPROCKET AND IMPROVED INVERTED TOOTH CHAIN FOR USE WITH SAME

CROSS-REFERENCE TO RELATED APPLICATIONS

This applications claims benefit of the filing date and priority from U.S. provisional application No. 60/378,273 filed May 6, 2002 and U.S. provisional application No. 60/387,219 filed Jun. 8, 2002.

BACKGROUND OF THE INVENTION

"Inverted tooth chains" also known as "silent chains" and mating sprockets for same are widely known and used. Conventional silent chains typically include both guide links and inverted tooth or "inside" links. The guide links are positioned on the outside edges of alternate sets of inverted tooth links. The guide links typically act to position the chain axially on the sprocket and they do not mesh with the sprocket teeth. The inverted tooth (inside) links provide the transfer of power between the chain and sprocket. Each inverted tooth link typically includes a pair of apertures and a pair of depending toes or teeth. Each toe is defined by an inside flank and an outside flank. The inside flanks are joined at the crotch of the link. The inverted tooth links are typically designed so that the links contact the sprocket teeth to transfer power between the chain assembly and the sprocket. The inverted tooth links contact the sprocket teeth along their inside link flanks or their outside link flanks or combinations of both flanks.

A conventional inverted tooth chain drive is comprised of an endless chain wrapped about at least two sprockets supported by shafts. Rotation of a drive sprocket causes power transmission through the chain and consequent movement of a driven sprocket. In a typical engine timing drive application, the drive sprocket is mounted on the engine crankshaft and the driven sprocket mounted on the camshaft.

Noise is associated with these inverted tooth chain drives. Noise is generated by, among other things, the impact sound generated by the collision of the chain and the sprocket at the onset of meshing. The loudness of the impact sound is affected by the impact velocity between the chain and the sprocket and the mass of chain links contacting the sprocket teeth. Another cause of noise is the chordal action of the chain. Chordal action occurs as a chain link encounters the sprocket from the free span. The meshing of the chain and sprocket at the chain mesh frequency can cause a movement of the free span in a direction perpendicular to the chain travel but in the same plane as the chain and sprockets. This vibratory movement can also produce an objectionable sonic tone.

Many efforts have been made to decrease the noise level associated with inverted tooth chain drives. The problem of noise reduction was addressed in U.S. Pat. No. 4,342,560 by changing the contacts between the link flanks of a silent chain and the sprocket teeth by having differently configured link flanks in different sets of the chain to alter the point and rhythm of contacts. A similar concept was used in U.S. Pat. No. 4,832,668. Each of these patents teaches the reduction of chain noise level by randomization of elements within the chain, such as link configuration or profile, or link aperture-to-flank spacing distance.

U.S. Pat. No. 4,915,675 utilized the same concept of modifying the pattern of sound emanating from the chain by altering the types of link configurations. That patent teaches the utilization of an asymmetrically shaped link which is then oriented in two different directions in the chain assembly to alter the point and rhythm of chain to sprocket contacts.

Other attempts to alter the rhythm of contacts between the chain and sprocket have focused on the modification of elements within the sprocket, such as the sprocket tooth profile or the spacing of the sprocket teeth on the sprocket. For example, U.S. Pat. Nos. 3,377,875 and 3,495,468, teach modification of certain sprocket teeth or even elimination of some teeth in order to achieve noise reduction in contacts between the links of the silent chain and the sprocket teeth.

Other noise reduction attempts include efforts to modify sound patterns by various phasing relationships between the chain assembly and the sprockets. Phasing the chain and sprocket relationship can reduce the number of chain link teeth (or mass of chain) impacting the sprocket during a given time increment. Similarly, phasing the chain and sprocket relationship can alter or phase the chordal action or articulation of the chain and sprocket. Both of these phasing modifications, alone and in conjunction with the randomization of the chain and sprocket contacts, can alter the impact and chordal action generated sound patterns.

SUMMARY OF THE INVENTION

In accordance with a first aspect of the present invention, a sprocket for an inverted tooth chain includes a hub. A plurality of teeth project radially outward from the hub and defining a ring that extends circumferentially around the hub. Each of the teeth is connected to adjacent teeth by a root surface and each of the teeth is separated from adjacent teeth by an open tooth space. A first cushion ring is connected to the hub on a first axial side of the ring of teeth. The first cushion ring includes a plurality of first compression pads. The first compression pads are located adjacent first axial faces of the plurality of teeth, respectively. Each of the first compression pads includes a first outer face adapted to engage guide links of an associated inverted tooth chain. A second cushion ring is connected to the hub on a second axial side of the ring of teeth. The second cushion ring includes a plurality of second compression pads. The second compression pads are located adjacent second axial faces of the plurality of teeth, respectively, and each of the second compression pads includes a second outer face adapted to engage guide links of an associated inverted tooth chain.

In accordance with another aspect of the present invention, an inverted tooth chain drive system includes a sprocket comprising: (i) a plurality of teeth separated by tooth spaces; and, (ii) at least one resilient cushion ring located adjacent said teeth. An inverted tooth chain is engaged with the teeth of the sprocket. The inverted tooth chain comprises guide links in contact with the at least one resilient cushion ring.

In accordance with another aspect of the present invention, an inverted tooth chain drive system includes a sprocket comprising: (i) a plurality of teeth separated by tooth spaces; and, (ii) first and second cushion rings located respectively adjacent first and second axial sides of the teeth. An inverted tooth chain is engaged with the sprocket and comprises a plurality of links interconnected in an endless series. The links comprise alternating first and second link types wherein: the first link type comprises: (i) an aligned plurality of inside links each comprising first and second toes located in said tooth spaces of said sprocket; and (ii) first and second inside guide links between which said aligned plurality of inside links are located. The first and second inside guide links are located respectively adjacent the first and second axial tooth faces and respectively engage the first and second cushion rings. The second link type comprises first and second outside guide links located respectively adjacent the first and second axial tooth faces and respectively engaging said first and second cushion rings.

In accordance with a further aspect of the present invention, an inverted tooth chain comprises a plurality of links interconnected in an endless series, said links comprising alternating first and second link types wherein: the first link type comprises: (i) an aligned plurality of inside links each comprising first and second toes adapted for receipt in tooth spaces of an associated sprocket; and, (ii) first and second inside guide links between which the aligned plurality of inside links are located. The first and second inside guide links at least partially overlap the first and second toes and a space defined between said toes, and the first and second inside guide links are adapted to receive a tooth of the associated sprocket there between. The second link type comprises first and second outside guide links adapted to receive a tooth of the associated sprocket there between.

BRIEF DESCRIPTION OF THE DRAWINGS

The invention comprises various components and arrangements of components, and various steps and arrangements of steps, preferred embodiments of which are illustrated in the accompanying drawings that form a part hereof and wherein:

FIG. 4D corresponds to FIG. 4C but shows the sprocket rotated clockwise one tooth;

FIG. 4E is a sectional view taken along line D—D of FIG. 4D (without showing the conventional chain);

FIG. 4F is a greatly enlarged view of portion W of FIG. 4D;

FIG. 5A illustrates an inverted tooth chain and sprocket drive system formed in accordance with the present invention and comprising a cushioned sprocket and improved inverted tooth chain for same; FIG. 5B partially illustrates the improved inverted tooth chain of FIG. 5A; FIG. 5C is a greatly enlarged view of portion Z of FIG. 5A; and, FIGS. 6A and 6B show the rear sides of the sprocket drive system and chain of FIGS. 5A and 5B, respectively.

DETAILED DESCRIPTION OF PREFERRED EMBODIMENTS

Figures 1, 1A:
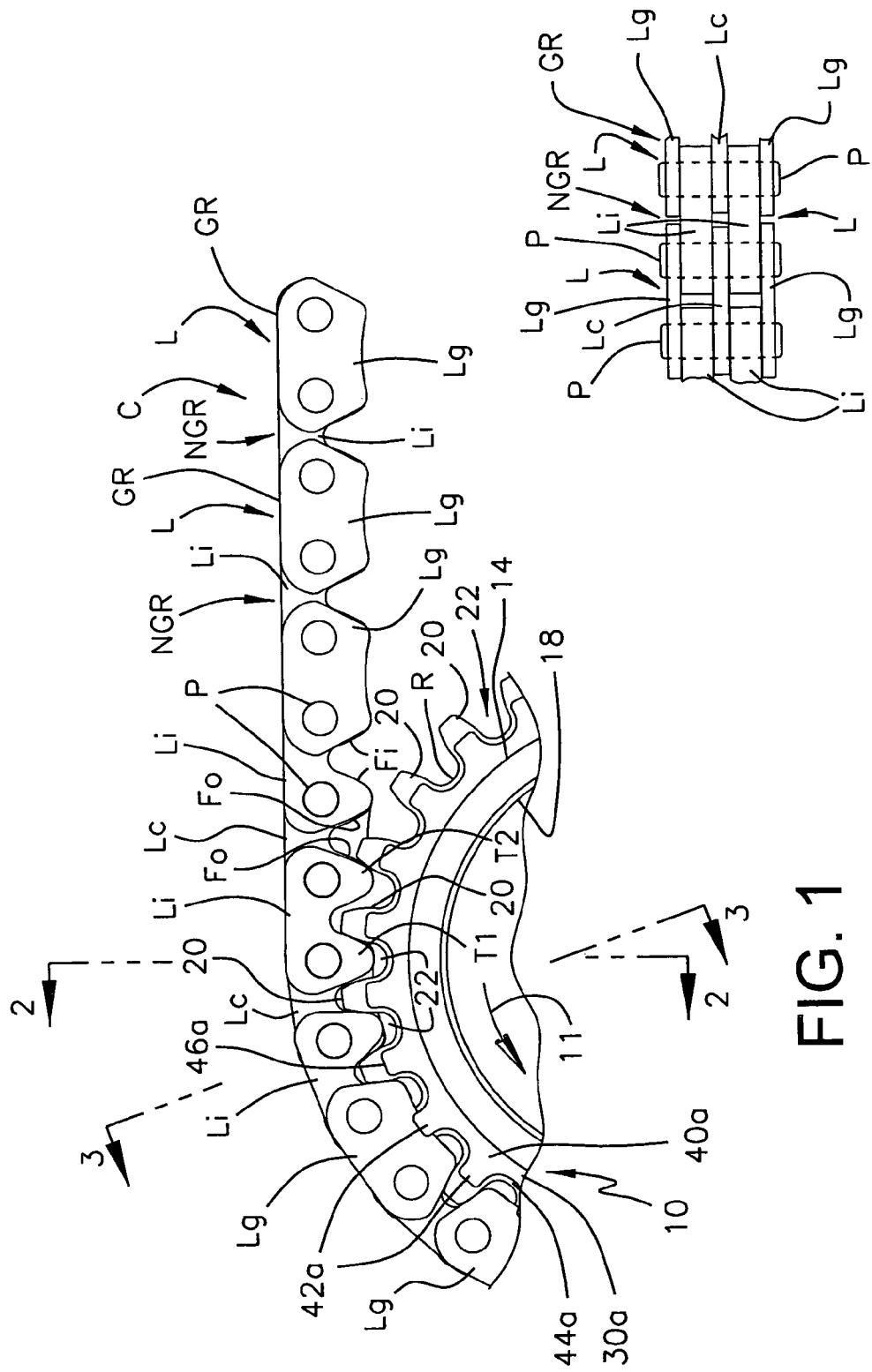
FIG. 1 partial front elevational view of a conventional inverted tooth chain meshing with a cushioned sprocket formed in accordance with the present invention.
FIG. 1A (prior art) is a top plan view of the conventional inverted tooth chain shown in FIG. 1.

FIG. 1 illustrates a cushioned or "rubberized" sprocket formed in accordance with the present invention and adapted for use with an associated conventional inverted tooth chain. For ease of illustration and understanding the present development, the sprocket is only partially illustrated and portions of the mating inverted tooth chain are broken away. Those of ordinary skill in the art will recognize that the entire sprocket and chain are formed identically to the illustrated portions.

More particularly, FIG. 1 illustrates sprocket 10 formed in accordance with the present invention. The sprocket 10 comprises a hub 14 that includes or defines a central aperture, recess or opening 18 that receives a mating boss, shaft or the like as is generally well known so that the sprocket rotates about an axis of rotation. A plurality of teeth 20 project radially outward from the hub 14 and extend circumferentially around the hub so as to define a ring of teeth. These teeth 20 are dimensioned and conformed to mate with an associated inverted tooth chain C that is conventional in all respects. Teeth 20 are defined with any suitable profile generally known for inverted tooth chains and adjacent teeth are separated from each other by a root surface R (see also FIG. 5A). As such, open tooth spaces 22 are defined between successive teeth. The hub 14 and teeth 20 are defined from one or more pieces of suitable metal such as steel or powdered metal. Each tooth includes first and second opposite axial faces $32a,32b$ (FIG. 2).

As noted, the inverted tooth chain C is conventional. The illustrated chain C is formed in accordance with the chain disclosed in U.S. Pat. No. 4,906,224 which is hereby expressly incorporated by reference herein. As is well known, the chain C comprises a plurality of articulating links L interconnected by pins P. Alternating links L are defined by an aligned group of internal or inside links Li, each of which defines first and second toes T1,T2. The toes T1,T2 are received in the tooth spaces 22 (typically without root contact) so that the inner flank surfaces Fi and outer flank surface Fo of the toes T1,T2 are drivingly engaged by the sprocket teeth 20. Certain links L define guide rows GR that comprise outer guide links Lg and connecting links Lc located between and aligned with the guide links Lg. The guide links Lg interconnect successive aligned groups of inside links Li and abut against opposite outer faces of same.

In use, the guide links Lg are received on opposite axial sides $32a,32b$ of the relevant tooth 20 when the guide row GR meshes with the sprocket and serve to prevent the chain C from moving axially out of engagement with the sprocket. As such, the chain C defines alternating guide rows GR (where the guide links Lg are located) and non-guide rows NGR defined by the inside links Li but that do not include any guide links Lg. As is well known, the guide links Lg (some of which are broken away in FIG. 1 to reveal the inside links Li ) do not drivingly engage the teeth 20 but, instead, are defined to prevent axial movement of the chain off of the teeth, i.e., the guide links hold the chain C on the sprocket teeth 20 while the flanks of the inside links Li are engaged with the sprocket teeth 20. The illustrated chain C is symmetrical in that side opposite the illustrated side is formed identically.

Figure 2:
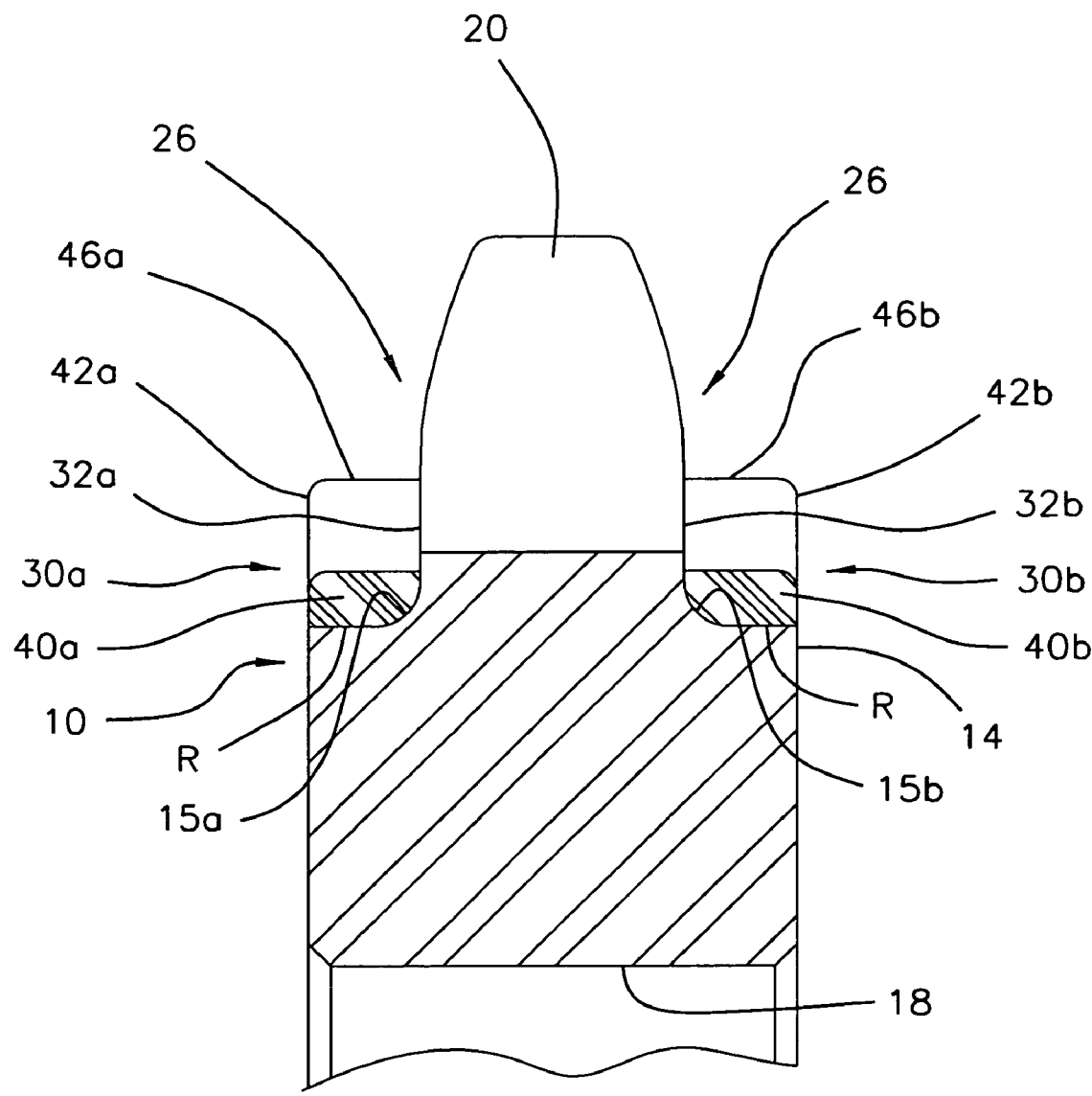
FIG. 2 is a sectional view of the sprocket illustrated in FIG. 1 as taken along line 2—2 without showing the associated conventional chain.
Figure 2A:
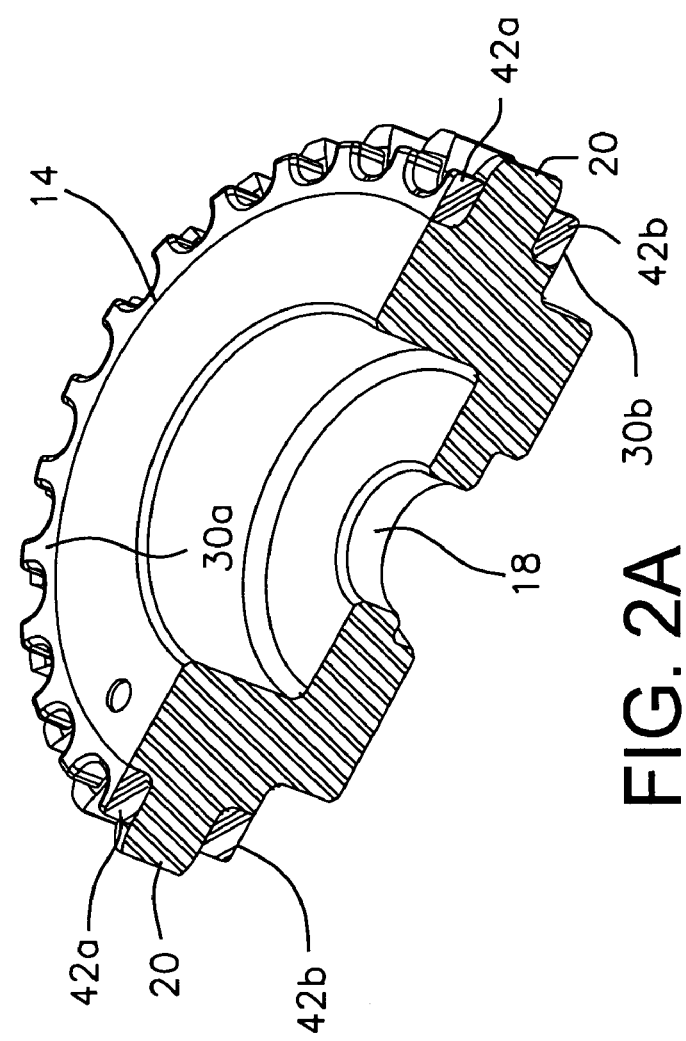
FIG. 2A is an isometric sectional view of the sprocket shown in FIG. 1.

Referring now to all of FIGS. 1, 2 and 2A, a cushioned sprocket 10 for use with the chain C or any other conventional inverted tooth chain is shown. The sprocket 10 is formed in accordance with the present invention and comprises at least one and, preferably, first and second cushion rings 30a,30b secured thereto adjacent respective opposite first and second axial faces 32a,32b of teeth 20. The cushion rings 30a,30b are preferably defined from a durable resilient material such as a molded elastomeric compound such as a rubber, e.g., a Nitrile rubber, or any other suitable resilient and durable compressible material.

The cushion ring 30a comprises an annular base 40a that is mounted to the hub 14 adjacent the first axial face 32a of the teeth 20. A plurality of compression pads 42a project radially outwardly from the annular base 40a. Circumferentially successive compression pads 42a are separated from each other by spaces 44a (FIG. 1). The cushion ring 30b comprises an annular base 40b that is mounted to the hub 14 adjacent the second axial face 32b of the teeth 20. A plurality of compression pads 42b project radially outwardly from the annular base 40b. Circumferentially successive compression pads 42b are separated from each other by spaces that correspond to the spaces 44b of the cushion ring 30a. The annular bases 40a,40b are preferably adhered to axial tooth faces 32a,32b, respectively, and to the hub 14.

The compression pads 42a,42b preferably contact (but preferably are not adhered to) the axial faces 32a,32b, respectively. Further, the compression pads 42a,42b and the respective annular bases 40a,40b preferably extend axially away from the respective axial tooth faces 32a,32b sufficiently so that the guide links of an associated inverted tooth chain C engage and compress the compression pads 42a,42b as described below so that the cushion rings 30a,30b dampen meshing impact of the chain C with the sprocket 10 to reduce noise and vibration. The cushion rings 30a,30b are preferably formed near to identical to each other as possible, but use of two different cushion rings is also contemplated.

The bases 40a,40b of the cushion rings 30a,30b are adhered to the hub 14. The bases 40a,40b are also preferably adhered to the tooth faces 32a,32b and fillet radius regions 15a,15b (FIG. 2) that blend the hub 14 into the tooth faces 32a,32b, respectively. The compression pads 42a,42b are preferably not adhered to the respective tooth faces 32a,32b, but can be fully or partially adhered to the respective faces 32a,32b without departing from the overall scope and intent of the invention. Having the pads 42a,42b non-adhered to the respective tooth faces 32a,32b, is often preferred because the compression pads 42a,42b must be compressed radially and will also be deflected circumferentially a small amount relative to the axial tooth faces 32a,32b in response to being engaged by guide links Lg during use. An adhesive bond between the pads 42a,42b and the respective tooth faces 32a,32b would inhibit such pad movement and could lead to excessive wear and damage to the pads 42a,42b in certain applications.

Referring still to FIGS. 1–2A, the cushion rings 30a,30b are conformed and arranged so that the compression pads 42a,42b lie adjacent and are aligned circumferentially with the teeth 20 while the spaces 44a,44b between successive pads 42a,42b are aligned circumferentially with the tooth spaces 22. No portion of either cushion ring 30a,30b interferes with or overlaps any portion of the tooth spaces 22, i.e., the cushion rings 30a,30b are completely clear of the tooth spaces 22. This includes the compression pad portions 42a,42b of the cushion rings that are conformed and arranged to be aligned with the teeth 20 so that no portion of the compression pads 42a,42b extends into the tooth spaces 22. Thus, it is preferred that each compression pad 42a,42b extend circumferentially, at most, to the edges of the adjacent tooth 20 to prevent the pad 42a,42b from extending into the relevant tooth spaces 22. Because each axial tooth face 32a,32b defines a side radius 26 (FIG. 2), injection molding of the cushion rings 30a,30b onto the sprocket 10 requires that the outermost face 46a,46b of each compression pad lie radially inward from this side radius, i.e., the outermost face 46a,46b should be adjacent a planar portion of each tooth 20.

Figure 2B:
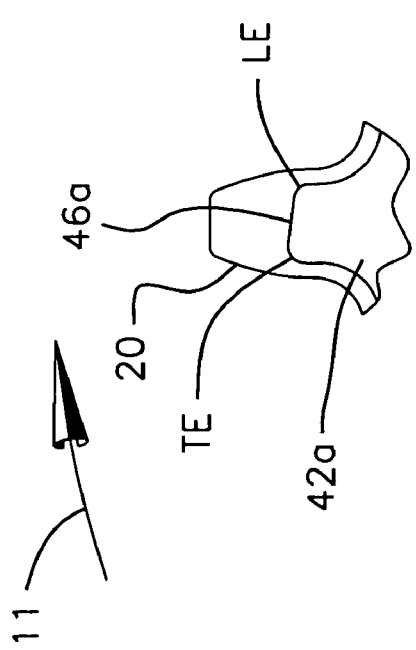
FIGS. 2B and 2C partially illustrate respective alternative sprockets formed in accordance with the present invention.

As described below, the compression pads 42a,42b include respective outermost faces 46a,46b that are engaged by the guide links Lg of an associated chain C. These outermost faces 46a,46b can be symmetrical or asymmetrical and can define a non-inclined planar surface, an inclined planar surface, a curved or arcuate surface or other shape surface as desired. In one such embodiment, as shown in FIG. 2B, the compression pads 42a,42b (only the pad 42a is shown) are defined with respective outermost faces 46a,46b that are radially lower or inward at a leading end portion LE (the portion that first encounters the guide links Lg) relative to a trailing end portion TE (the portion that encounters the guide links Lg after the leading end portion) for a clockwise direction of sprocket rotation 11. In such case, the compression pads 42a,42b further enhance dampening during meshing but are less prone to wear and compression-set over time.

Figure 2C:
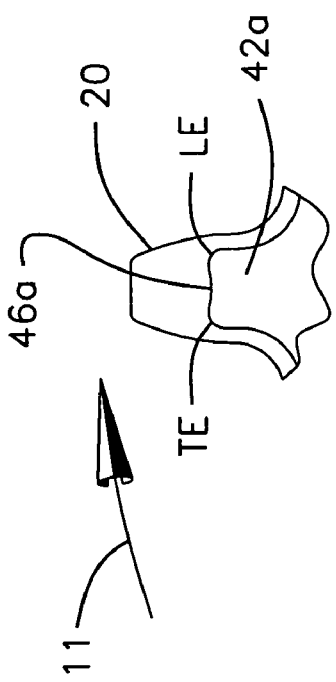

FIG. 2C illustrates another alternative embodiment for the compression pads 42a,42b (only the pad 42a is shown) wherein the outer face portion 46a,46b is symmetrical but concave between the leading end LE and trailing end TE. Forming the pad outer surfaces 46a,46b as shown in FIG. 2C minimizes wear and compression-set without meaningful loss of dampening.

In all cases, however, the outer faces 46a,46b must be located sufficiently radially outward so that they are engaged by the guide links Lg. As shown in FIG. 2 this means that the outer faces 46a,46b or portions thereof will be located radially outward relative to an innermost point or region of the root surface R between successive teeth 20. Typically, the outer faces 46a,46b or portions thereof will be located radially outward from all portions of the root surface R. Of course, the exact location of the surfaces 46a,46b will vary depending upon the dimensions and configuration of the inverted tooth chain C.

Figure 3:
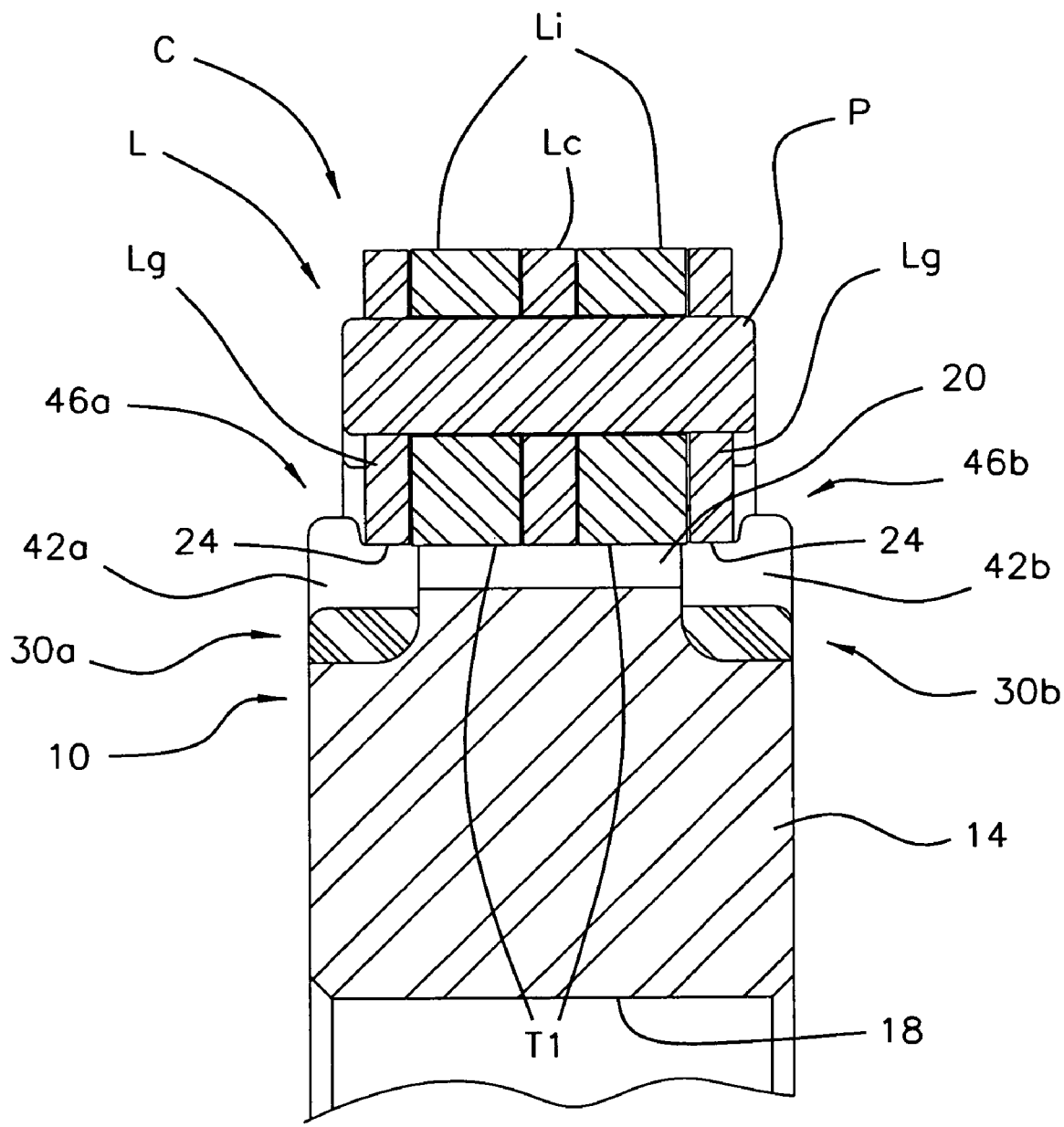
FIG. 3 is a sectional view taken along line 3—3 of FIG. 1 and diagrammatically showing the conventional inverted tooth chain (including links removed from FIG. 1) engaging the cushioned sprocket.

FIG. 3 illustrates operation of the cushioned sprocket 10 in conjunction with the associated conventional inverted tooth chain C in a sectional view taken along line 3—3 of FIG. 1. In particular, FIG. 3 illustrates a link L of the chain C fully meshed with tooth 20 of sprocket 10. The link L comprises a stacked plurality of aligned inside links Li partially flanked on opposite sides by guide links Lg. Sections of the first toes T1 of the inside links Li are visible. The guide links Lg are engaged with respective cushion rings 30a,30b. Specifically, one of the guide links Lg is engaged with the outermost surface 46a of a compression pad 42a of cushion ring 30a while the other guide link Lg is engaged with the outermost surface 46b of a compression pad 42b of cushion ring 30b. It can be seen that lowermost or radially innermost edges 24 of the guide links Lg engage and compress the compression pads 42a,42b so that during meshing, the compression pads 42a,42b dampen the impact of the chain C with the sprocket 10 to reduce noise and vibration. When the sprocket rotates sufficiently so that the link L is disengaged therefrom, the compression pads 42a, 42b resiliently expand radially outwardly to (or at least near) the position shown in FIG. 2.

Those of ordinary skill in the art will recognize from the foregoing that only the guide links Lg contact the compression pads 42a,42b. As such, as shown in FIG. 1, only alternating ones of the pads 42a,42b are engaged by guide links Lg at any instant. Those of ordinary skill in the art will also recognize that if the sprocket 10 has an even number Z of teeth 20 and if it is being used in a timed system, the cushion rings 30a,30b can be defined to include only Z/2 compression pads 42a,42b because only every other pad 42a,42b of the sprocket 10 will ever be engaged by a guide link Lg. Therefore, the number of pads 42a,42b can be reduced by half, and a corresponding savings in material can be obtained.

Figure 4A:
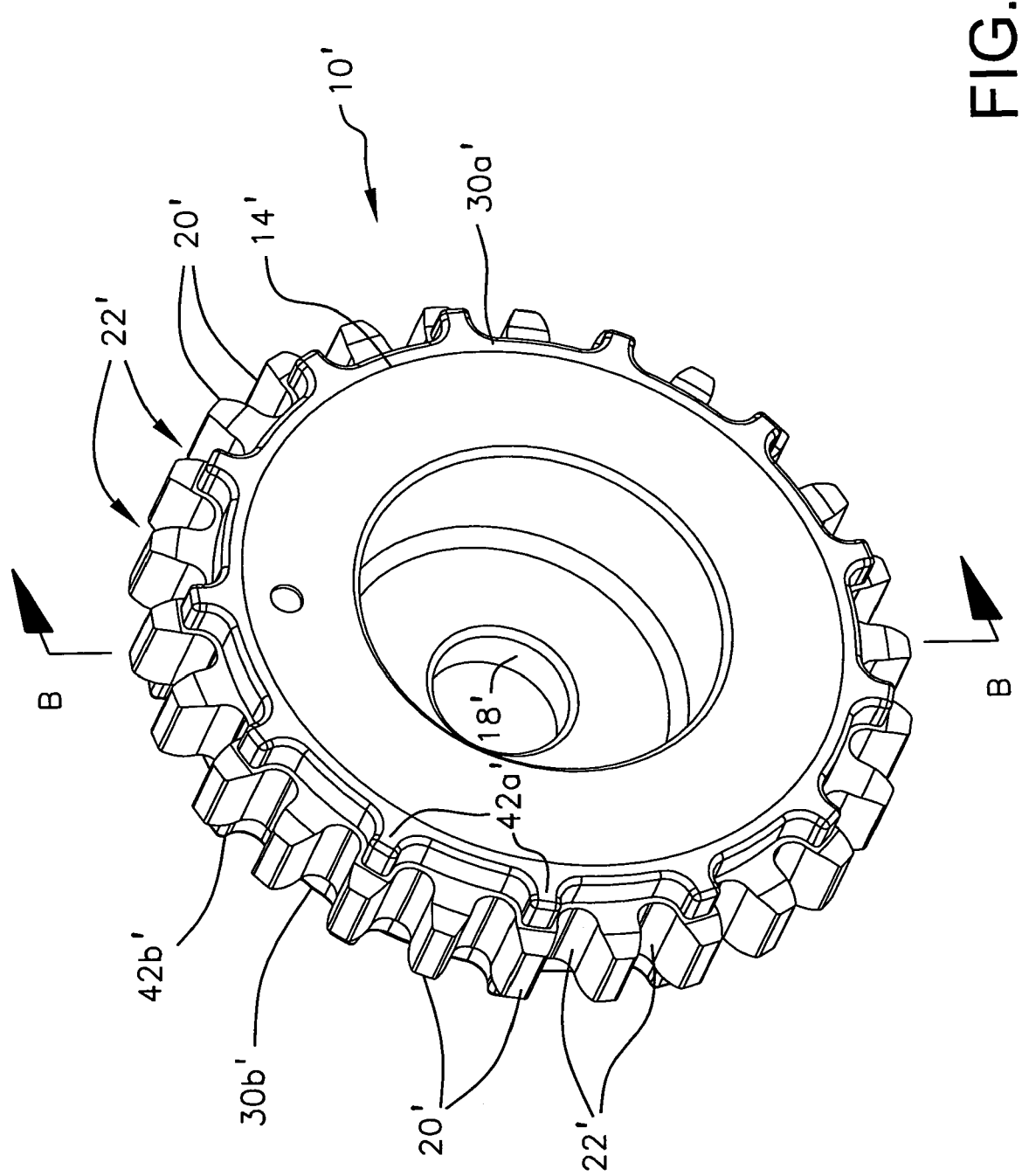
FIG. 4A is an isometric illustration of a sprocket for an inverted tooth chain formed in accordance with another embodiment of the present invention.
Figures 4B, 4C:
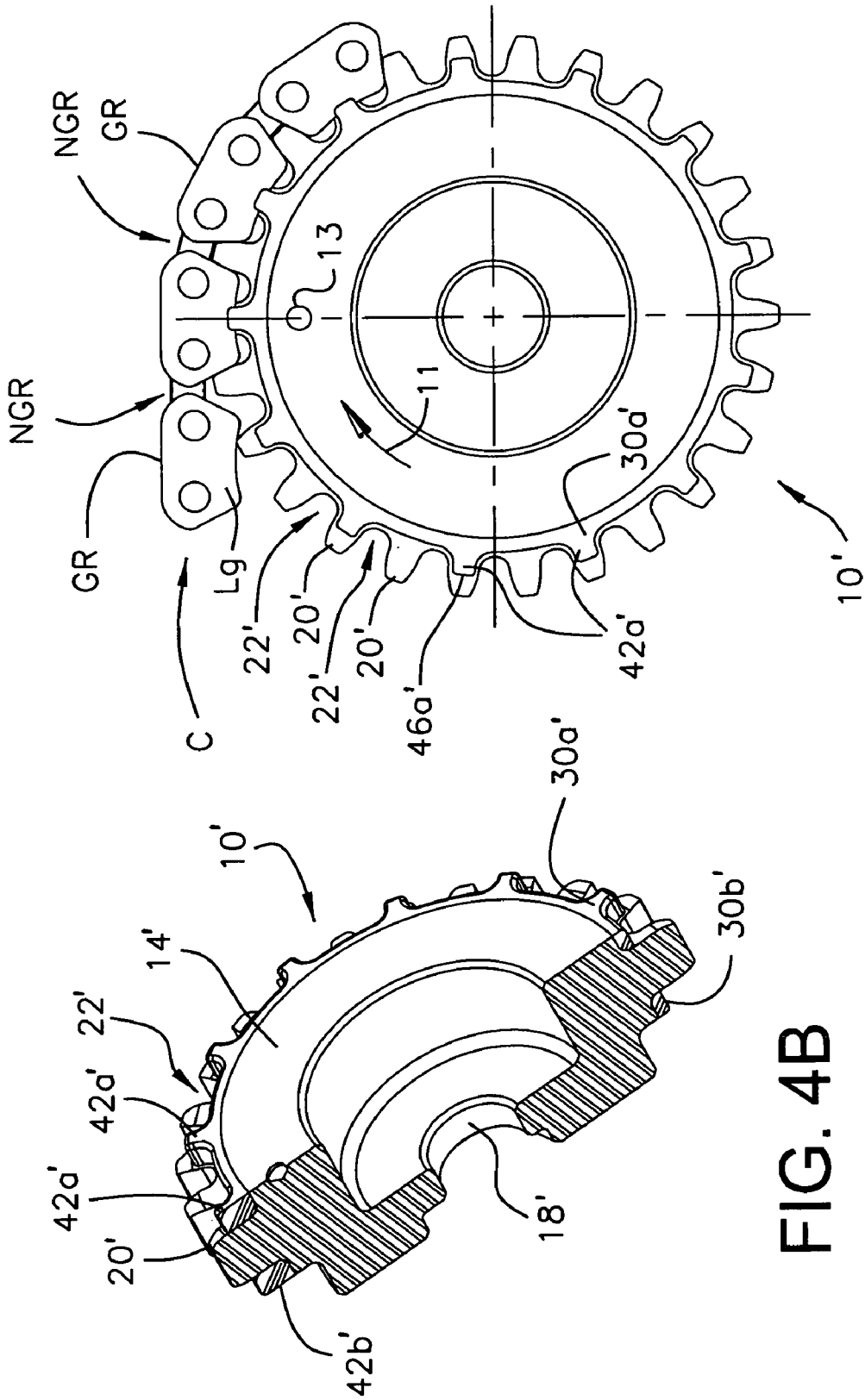
FIG. 4B is a sectional view of the sprocket of FIG. 4A as taken along line B—B of FIG. 4A.
FIG. 4C is a front elevational view of the cushioned sprocket of FIG. 4A and showing an associated conventional inverted tooth chain engaged therewith.

With the foregoing in mind, FIGS. 4A–4C illustrate an alternative embodiment of a rubberized inverted tooth sprocket 10' formed in accordance with the present invention. Except as otherwise shown and described, the sprocket 10' is identical to the sprocket 10 and, thus, like reference characters including a primed (') suffix have been used to identify like components relative to FIGS. 1–3.

The sprocket 10' includes compression rings 30a',30b' that include compression pads 42a',42b' projecting radially outwardly therefrom adjacent the teeth 20' as described above in connection with the sprocket 10. However, the pads 42a',42b' are located adjacent only every other tooth 20' of the sprocket 10'. It should be noted, with reference to FIG. 4C, that the guide links Lg of the guide rows GR engage and compression that pads 42a',42b' in the same manner as described above in relation to FIGS. 1–3. It can also be seen in FIG. 4C that the non-guide rows NGR of the chain C are aligned with the teeth 20' of the sprocket 10' that are located circumferentially between the pads 42a',42b'.

FIGS. 4D and 4E correspond exactly to FIGS. 4C and 4B, respectively, except that the sprocket has been rotated in the clockwise direction of rotation 11 a distance equal to one tooth or one chain link pitch (as indicated by the timing mark 13). With reference to FIG. 4D, it is most preferred for the sprocket 10' that the compression pads 42a',42b' be dimensioned and shaped relative to the chain C and teeth 20' in such a manner that the guide links Lg-1 (only one shown) of the next engaging guide row GR-1 contact the compression pads 42a',42b' before the links of the presently engaging non-guide row NGR-1 are fully meshed with the sprocket 10'. As illustrated in FIGS. 4D and 4F, the guide links Lg-1 (only one visible) are compressing the compression pads 42a',42b' by a distance C2 before the links of the non-guide row NGR-1 are fully meshed with the sprocket 10'. In this manner, meshing of the non-guide row NGR-1 is dampened somewhat even though no compression pads 42a,42b are provided to directly engage the links defining the non-guide row NGR-1.

FIGS. 5A and 6A respectively illustrate the front and rear sides of an inverted tooth chain and sprocket system 100 formed in accordance with another embodiment of the present invention. The system 100 comprises a novel and unobvious inverted tooth chain C2 that operably engages the cushioned sprocket 10 as shown in and described with reference to FIGS. 1–3. Referring also to FIG. 5B FIGS. 5B and 6B, that respectively illustrate the front and rear sides of the chain C2 by itself, the chain C2 is identical to a conventional inverted tooth chain C (FIGS. 1, 1A, 3), except that it further includes non-guide row guide links NGR-Lg (also referred to as "inside" guide links) in addition to the conventional guide links Lg (also referred to as "outside" guide links) of the guide rows GR. The inside guide links NGR-Lg are located on opposite lateral sides of the chain and are aligned with each group of inside links Li as shown, i.e., the inside guide links NGR-Lg flank each group of inside links Li on opposite sides thereof and are conformed and arranged to lie on opposite sides of the teeth 20 that are engaged by the non-guide rows NGR. Those of ordinary skill in the art will recognize that the chain is symmetrical.

With particular reference now to the chain embodiment illustrated in FIGS. 5B and 6B, the inside guide links NGR-Lg are substantially identical to the inside links Li (because they must articulate relative to the pins P with the guide links) but the inside guide links NGR-Lg define an overall peripheral shape and size that is substantially identical to that of the outside guide links Lg. Of course, the overall peripheral shape and size of the inside guide links NGR-Lg can vary and need not be the same as that for the guide links Lg. In certain cases, it will be desirable to provide the inside guide links NGR-Lg and outside guide links Lg with different shapes relative to each other to reduce the likelihood of these links from becoming mixed which could lead to improper chain assembly. It is important, however, that the inner edge or surface 122 of the inside guide links NGR-Lg be shaped and located to engage and compress the pads 42a,42b in the same or similar manner as the inner surface 124 of the outside guide links Lg. As such, each inside guide link NGR-Lg is conformed and dimensioned so that it at least partially covers or overlaps the toes T1,T2 and the space define between the toes T1,T2 of the inside links Li flanked thereby.

The chain C2 provides a structure for dampening meshing engagement of both the guide rows GR and non-guide rows NGR with the sprocket 10. As shown in FIGS. 5A and 5C, the inside guide link NGR-Lg compresses the compression pad 42a by a distance C1 when the non-guide row engages the tooth 20.

In general, it can be seen that the chain C2, when used in conjunction with the sprocket 10, provides a system where every compression pad 42a,42b is engaged and compressed during meshing engagement of all guide rows GR and non-guide rows NGR of the chain. Of course, the end result is that each row of the chain becomes a guide row—either by way of the outside guide links Lg or the inside guide links NGR-Lg. In this manner, either the links Lg or the links NGR-Lg engage the compression pads 42a,42b to dampen meshing engagement of the chain C2 with the sprocket 10 for all rows of the chain.

The invention has been described with reference to preferred embodiments. Modifications and alterations will occur to those of ordinary skill in the art to which the invention pertains, and it is intended that the invention be construed as encompassing all such modifications and alterations.

I claim:

1. A sprocket for an inverted tooth chain, said sprocket comprising:
   a hub;
   a plurality of teeth projecting radially outward from said hub and defining a ring that extends circumferentially around said hub, each of said teeth connected to an adjacent tooth by a root surface and each of said teeth separated from an adjacent tooth by an open tooth space;
   a first one-piece molded elastomeric cushion ring connected to said hub on a first axial side of said ring of teeth, said first cushion ring comprising a first annular base and a plurality of resiliently compressible first compression pads that each project radially outward from said first annular base, each first compression pad located adjacent a first axial face of a respective one of said plurality of teeth between and without interfering with tooth spaces adjacent said respective one of said teeth, each of said first compression pads comprising a first outer face located radially outward relative to said root surface connecting said respective one of said teeth to an adjacent tooth and adapted to engage and be resiliently compressed by guide links of an associated inverted tooth chain; and a second one-piece molded elastomeric cushion ring connected to said hub on a second axial side of said ring of teeth, said second cushion ring comprising a second annular base and a plurality of resiliently compressible second compression pads that each project radially outward from said second annular base, each second compression pad located adjacent a second axial face of a respective one of said plurality of teeth between and without interfering with tooth spaces adjacent said respective one of said teeth, each of said second compression pads comprising a second outer face located radially outward relative to said root surface connecting said respective one of said teeth to an adjacent tooth and adapted to engage and be resiliently compressed by guide links of the associated inverted tooth chain, wherein said first compression pads of said first cushion ring are non-adhered to said respective first axial tooth faces to allow radial and circumferential movement of each of said first compression pads relative to said first axial tooth face; and, wherein said second compression pads of said second cushion ring are non-adhered to said respective second axial tooth faces to allow radial and circumferential movement of each of said second compression pads relative to said second axial tooth face.

2. The sprocket as set forth in claim 1, wherein said first and second cushion rings are each defined as one-piece molded elastomeric constructions comprising Nitrile rubber.

3. The sprocket as set forth in claim 1, wherein a total of Z teeth define said ring of teeth, said first cushion ring comprises less than Z first compression pads, and second cushion ring comprises less than Z compression pads, wherein Z is a variable that represents a total number of teeth defining said ring of teeth.

4. The sprocket as set forth in claim 1, wherein a total of Z teeth define said ring of teeth, said first cushion ring comprises Z first compression pads, and said second cushion ring comprises Z compression pads, wherein Z is a variable that represents a total number of teeth defining said ring of teeth.

5. The sprocket as set forth in claim 1, wherein:

each of said first and second compression pads defines a leading portion and a trailing portion in terms of a direction of rotation of said sprocket;

said first outer face of each of said first compression pads is inclined with said leading portion thereof radially misaligned with a trailing portion thereof; and, said second outer face of each of said second compression pads is inclined with said leading portion thereof radially misaligned with a trailing portion thereof.

6. The sprocket as set forth in claim 5, wherein, for each of said first and second compression pads, said leading portion thereof is located radially inward relative to a trailing portion thereof.

7. The sprocket as set forth in claim 1, further comprising:

an inverted tooth chain engaged with said teeth of said sprocket, said inverted tooth chain comprising first guide links in respective contact with said first compression pads and second guide links in respective contact with said second compression pads.

8. The sprocket of claim 7, wherein:

a total of Z teeth define said ring of teeth, said first cushion ring comprises Z first compression pads, and said second cushion ring comprises Z compression pads, wherein Z is a variable that represents a total number of teeth defining said ring of teeth;

and wherein said inverted tooth chain comprises alternating first and second link structures, wherein each of said first and second link structures comprises first and second guide links that respectively engage and compress said first and second compression pads of said first and second cushion rings during rotation of said sprocket.

* * * * *